US012657965B2

(12) United States Patent
Nagata et al.

(10) Patent No.: US 12,657,965 B2
(45) Date of Patent: Jun. 16, 2026

(54) AUTOMATED OPERATOR INTERFACE

(71) Applicant: TOYOTA MOTOR ENGINEERING & MANUFACTURING NORTH AMERICA, INC., Plano, TX (US)

(72) Inventors: Katsumi Nagata, Foster City, CA (US); Ryan M. Wiesenberg, Ann Arbor, MI (US); Christopher J. Risberg, Flower Mound, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 728 days.

(21) Appl. No.: 16/719,033

(22) Filed: Dec. 18, 2019

(65) Prior Publication Data

US 2021/0192862 A1 Jun. 24, 2021

(51) Int. Cl.

| | |
|---|---|
| ***G07C 5/00*** | (2006.01) |
| ***G07C 5/08*** | (2006.01) |
| ***G08G 1/01*** | (2006.01) |
| ***H04M 3/51*** | (2006.01) |
| ***H04M 3/527*** | (2006.01) |
| ***H04W 4/90*** | (2018.01) |

(52) U.S. Cl.

CPC ........... *G07C 5/008* (2013.01); *G07C 5/0808* (2013.01); *G08G 1/0112* (2013.01); *H04M 3/5116* (2013.01); *H04M 3/527* (2013.01); *H04W 4/90* (2018.02); *H04M 2242/04* (2013.01)

(58) Field of Classification Search

CPC ....... G07C 5/008; G07C 5/0808; H04W 4/90; G08G 1/0112; H04M 3/5116; H04M 3/527; H04M 2242/04

See application file for complete search history.

(56) References Cited

U.S. PATENT DOCUMENTS

| | | | | |
|---|---|---|---|---|
| 8,428,548 | B2 | 4/2013 | Ray | |
| 8,731,741 | B2 | 5/2014 | Oesterling | |
| 9,449,495 | B1 | 9/2016 | Call | |
| 9,646,428 | B1 * | 5/2017 | Konrardy | G06Q 10/0635 |
| 9,998,892 | B2 | 6/2018 | Tzirkel-Hancock | |
| 2013/0332026 | A1 | 12/2013 | Mckown | |
| 2016/0029197 | A1 * | 1/2016 | Gellens | H04L 65/65 455/404.1 |
| 2017/0251347 | A1 * | 8/2017 | Mehta | H04W 4/08 |
| 2018/0197409 | A1 * | 7/2018 | Youm | G08B 25/10 |
| 2019/0122543 | A1 * | 4/2019 | Matus | G08G 1/0133 |
| 2020/0274962 | A1 * | 8/2020 | Martin | H04W 4/14 |
| 2020/0334928 | A1 * | 10/2020 | Bourke | G07C 5/0825 |
| 2021/0086778 | A1 * | 3/2021 | Suthar | B60Q 1/544 |

FOREIGN PATENT DOCUMENTS

| | | | | |
|---|---|---|---|---|
| CN | 102568056 A | * | 7/2012 | G07C 5/008 |
| CN | 110606040 B | * | 7/2021 | B60R 21/00 |

* cited by examiner

*Primary Examiner* — Adam M Alharbi

(74) *Attorney, Agent, or Firm* — SHEPPARD, MULLIN, RICHTER & HAMPTON LLP; Daniel N. Yannuzzi

(57) ABSTRACT

Systems and methods are provided for initiating a telematics call in response to a collision involving a vehicle, including: receiving sensor data from a plurality of vehicle sensors; determining severity of the collision based on sensor data; and if the severity of the collision is above a determined threshold, initiating a telematics call to a live operator for assistance, but if the severity of the collision is not above the determined threshold, initiating the telematics call to an automated attendant for assistance.

22 Claims, 6 Drawing Sheets

IDENTIFY REASON FOR CALL — 442

RECEIVE/COLLECT DATA ASSOCIATED WITH INCIDENT — 444

PREPROCESS INCIDENT DATA — 446

GENERATE PREDICTION — 448

USE PREDICTION TO MAKE CALL ROUTING DECISION — 450

EXECUTE USING DECISION RESULT — 452

500

PROCESSOR 504

MEMORY
508

STORAGE DEVICES
510

MEDIA DRIVE
512

MEDIA
514

STORAGE
UNIT I/F
520

STORAGE
UNIT
522

BUS
502

COMM I/F 524

CHANNEL 528

AUTOMATED OPERATOR INTERFACE

TECHNICAL FIELD

The present disclosure relates generally to vehicle telematics, and in particular, some implementations may relate to automated call routing for a vehicle telematics system.

DESCRIPTION OF RELATED ART

Vehicle telematics systems can take many forms. Some systems allow the vehicle or its operator to make a call, or otherwise establish a communication link between vehicle occupants and a call center. Such calls can be placed for location or concierge type assistance whereas other calls can be placed for emergency support. Conventional systems typically don't have an automated approach to determining whether a call should be routed directly to a live operator. Instead, such systems often rely on caller responses once a call is initiated to determine whether the call should be routed to a live operator.

BRIEF SUMMARY OF THE DISCLOSURE

According to various embodiments of the disclosed technology a method for initiating a telematics call in response to a collision involving a vehicle may include: receiving sensor data from a plurality of vehicle sensors; determining severity of the collision based on sensor data; and if the severity of the collision is above a determined threshold, initiating a telematics call to a live operator for assistance, but if the severity of the collision is not above the determined threshold, initiating the telematics call to an automated attendant for assistance.

Determining the severity of the collision may include using an AI model to predict the severity of the collision based on received sensor data, wherein the AI model is developed and trained using sensor data from a plurality of different vehicles involved in collisions.

Embodiments may include receiving vehicle environment data from third-party data sources and using the vehicle environment data to predict the severity of the condition.

Sensor data may include vehicle sensor data and environment sensor data.

Vehicle environment data may include at least one of traffic information, disaster or event information, information from surrounding vehicles or other vehicles involved in the collision, and weather information.

The threshold may be determined for the vehicle based on vehicle characteristics. The threshold may be determined using a threshold set for an occupant of the vehicle.

A system for initiating a telematics call in response to a collision involving a vehicle may include: a plurality of vehicle sensors to sense parameters of the vehicle; a severity detection circuit to predict a severity of the collision using data from the vehicle sensors; a threshold detection circuit to determine whether the predicted severity of the collision is above a determined threshold; a telematics unit to place a telematics call to a live operator for assistance if the predicted severity of the collision is above the determined threshold, but if the severity of the collision is not above the determined threshold, initiating the telematics call to an automated attendant for assistance.

Determining the severity of the collision may include using an AI model to predict the severity of the collision based on received sensor data, wherein the AI model is developed and trained using sensor data from a plurality of different vehicles involved in collisions.

The severity detection circuit is further configured to predict a severity of the collision using data from vehicle systems and the vehicle sensors. The severity detection circuit is further configured to predict a severity of the collision using data from external systems and the vehicle sensors.

The threshold may be determined for the vehicle based on vehicle characteristics. The threshold may be determined using a threshold set for an occupant of the vehicle.

A control system for initiating a telematics call may include: a processor; and a memory coupled to the processor to store instructions, which when executed by the processor, cause the processor to perform operations for initiating the telematics call in response to a collision involving the vehicle, the operations may include receiving sensor data from a plurality of vehicle sensors; determining severity of the collision based on sensor data; and if the severity of the collision is above a determined threshold, initiating a telematics call to a live operator for assistance, but if the severity of the collision is not above the determined threshold, initiating the telematics call to an automated attendant for assistance.

Determining the severity of the collision may include using an AI model to predict the severity of the collision based on received sensor data, wherein the AI model is developed and trained using sensor data from a plurality of different vehicles involved in collisions. Determining the severity of the collision me be further based on data from vehicle systems.

The operations may include receiving vehicle environment data from third-party data sources and using the vehicle environment data to predict the severity of the condition. The vehicle environment data may include at least one of traffic information, disaster or event information, information from surrounding vehicles or other vehicles involved in the collision, and weather information. The threshold may be determined for the vehicle based on vehicle characteristics. The threshold may be determined using a threshold set for an occupant of the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments may be implemented to determine routing of an emergency Telematics call before the call itself is initiated. Embodiments can be implemented to gather vehicle sensor data to determine whether a Toyota Safety Connect® (or like) call should be made. The system receives and evaluates sensor data and, depending on the state of the data, initiates a call from the vehicle. The sensor data is further evaluated to determine the urgency level of the call. Where the urgency level exceeds a determined urgency threshold, the system automatically concludes that the call should be placed to a live operator versus an automated attendant and initiates the call accordingly.

The sensor data might include, for example, crash sensor data, accelerator data, wheelspin data, airbag deployment data, and data from other sensors that may be useful to predict the urgency or severity of the event triggering the call. Past events, whether from the current vehicle or crowd-sourced from a number of different vehicles, can be used to build and refine an AI model to predict the likelihood that a high-urgency event (e.g., a life-threatening or severe event) has taken place. This prediction is used to determine routing of a Toyota Safety Connect (or other like service) call.

The system can also evaluate environmental or other external data when making the prediction. For example, a combination of weather data or other third-party data along with vehicle sensor data can be used to train and refine the model and to make a more accurate prediction when an incident occurs. As with sensor data, this external data may also be crowd sourced from a number of other vehicles and occurrences to build, train and refine the AI models. The external data can include data items such as weather data, traffic information (e.g., speed, density or proximity of surrounding traffic), disaster or event information, information from surrounding vehicles or other vehicles involved in the incident (if any), and so on In various embodiments, the system may be configured such that it does not rely on responses in an existing call but instead uses vehicle sensor data, and in some cases external data, to predict an urgency level (e.g. life-threatening situation) before the call is placed. This information can place the call directly into the hands of the appropriate recipient (automated or life attendant) based on this information. This can avoid delays associated with placing the call in the hands of one attended initially and then evaluating the situation and transferring the call to a more appropriate attendant.

Figure 1:
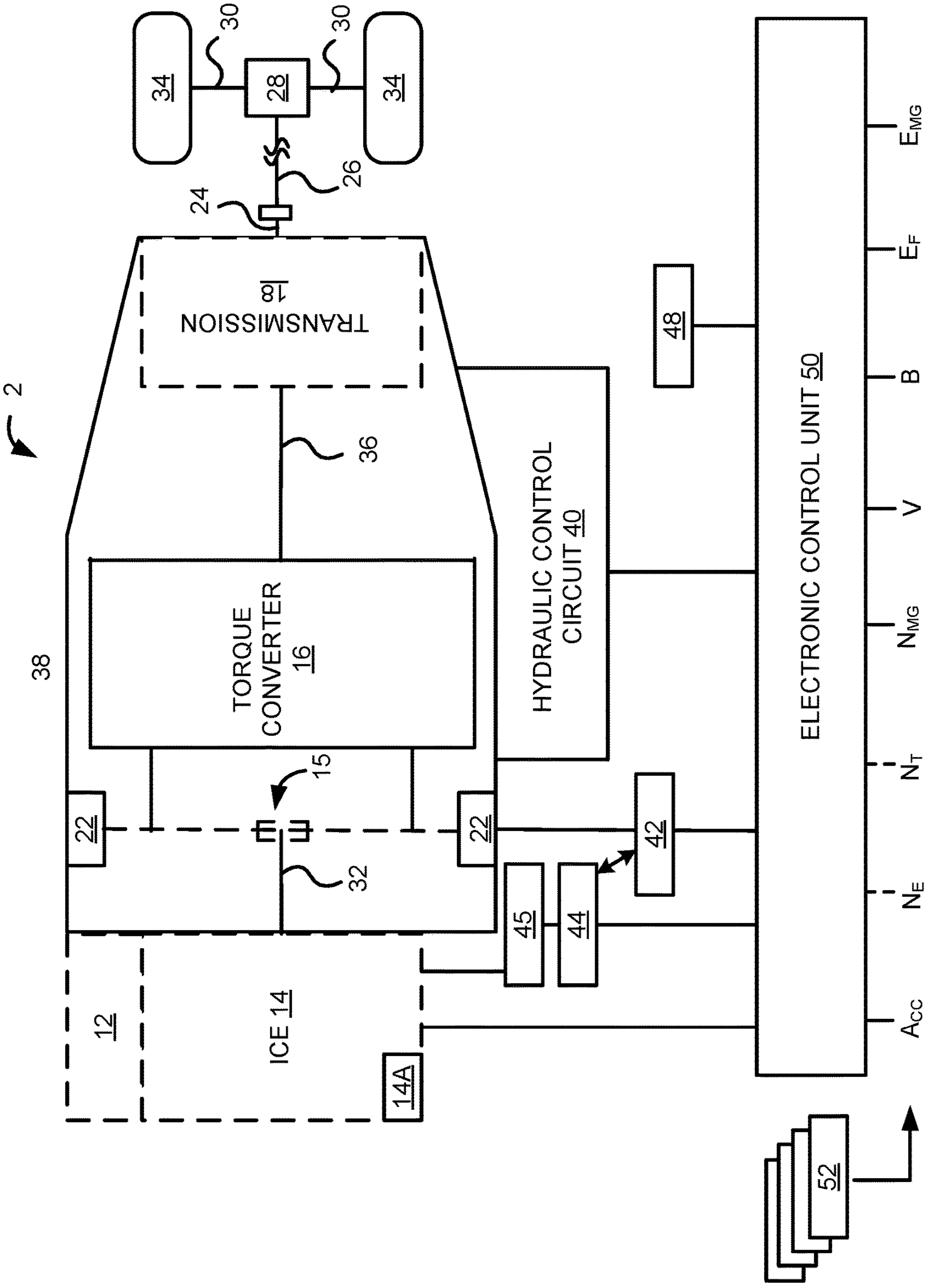
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for providing an automated operator interface can be implemented in other types of vehicle including gasoline- or diesel-powered vehicles, fuel-cell vehicles, electric vehicles, or other vehicles.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
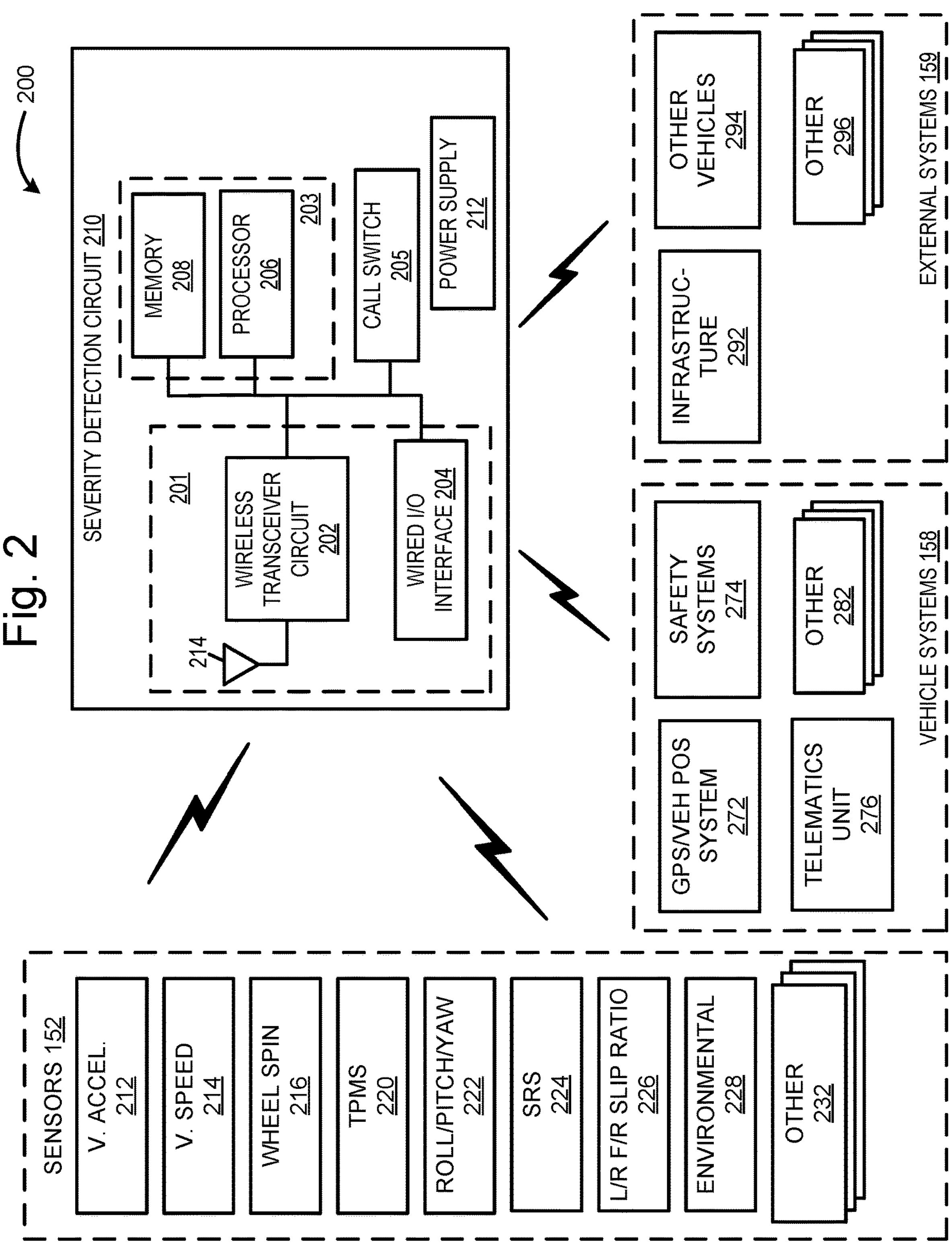
FIG. 2 illustrates an example architecture for providing an automated operator interface in accordance with one embodiment of the systems and methods described herein.

FIG. 2 illustrates an example architecture for detecting an incident and providing automated operator interface in accordance with one embodiment of the systems and methods described herein. Referring now to FIG. 2, in this example, automated operator interface system 200 includes an severity determination circuit 210, a plurality of sensors 152 and a plurality of vehicle systems 158. Sensors 152 and vehicle systems 158 can communicate with severity determination circuit 210 via a wired or wireless communication interface. Although sensors 152 and vehicle systems 158 are depicted as communicating with severity determination circuit 210, they can also communicate with each other as well as with other vehicle systems. Severity determination circuit 210 can be implemented as an ECU or as part of an ECU such as, for example electronic control unit 50. In other embodiments, severity determination circuit 210 can be implemented independently of the ECU.

Severity determination circuit 210 in this example includes a communication circuit 201, a decision circuit 203 (including a processor 206 and memory 208 in this example) and a power supply 212. Components of severity determination circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to severity determination circuit 210. Memory 208 can also store the AI model received by communication circuit 201.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines, such as updatable AI model to determine various decisions. or other mechanisms might be implemented to make up a severity determination circuit 210.

Communication circuit 201 either or both a wireless transceiver circuit 202 with an associated antenna 214 and a wired I/O interface 204 with an associated hardwired data port (not illustrated). As this example illustrates, communications with severity determination circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by severity determination circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which the automated operator interface system is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, safety restraint system (e.g., airbag-related) sensors 224, left-right and front-rear slip ratio sensors 226, and environmental sensors 228 (e.g., to detect slippery conditions or other environmental conditions). Additional sensors 232 can also be included as may be appropriate for a given implementation of the automated operator interface system.

For example, information regarding vehicle acceleration, speed, roll/pitch/yaw and so on can be used to assess the severity of the crash. For example, this information can be used to evaluate how fast vehicle was traveling when the incident occurred, a rate of deceleration to which the vehicle was subjected as part of the incident, vehicle trajectory, and so on. Information from a safety restraint system or other vehicle safety system can also be used, to determine severity of the crash. For example, the system can determine whether airbags were deployed, the severity of the impact using airbag crash sensors and so on.

Vehicle systems 158 can include any of a number of different vehicle components or subsystems used to control or monitor various aspects of the vehicle and its performance. In this example, the vehicle systems 158 include a GPS or other vehicle positioning system 272; vehicle safety systems 274 that can sense the severity of a crash for example; and other vehicle systems 282. Vehicle systems 158 can also include a telematics unit 276 to provide communication with a call center or other automated or live operator attendant for various purposes. For example, telematics unit 276 may be configured to place a wireless call that can include voice and data capabilities to allow the vehicle or its occupants to request assistance and to allow a live or automated attendant to respond to the occupants. Telematics unit 276 can include a telematics control unit and can include an external interface for wireless communication such as through one or more various cellular, Wi-Fi, WiMAX or other communication protocols.

External systems 159 can also provide data to severity detection circuit 210, and this external data can be used by the system to determine the severity of an incident. For example, infrastructure elements 292 can be used to monitor various parameters including vehicle and roadway parameters information such as the speed of the vehicle or surrounding vehicles, acceleration or deceleration of the vehicle and so on can be used to determine the severity of the crash. Additionally, cameras capturing images of the scene can provide image data which can be evaluated to assess the severity of an incident. Information from other vehicles. 294 can also be used to determine the severity of an incident. For example, following vehicles, approaching vehicles, surrounding vehicles and other vehicles can provide information from their sensors (including image sensors) that can be used to evaluate the severity of an incident. Other external systems 296 may also be used together data that can be helpful in determining the severity of an incident.

During operation, severity determination circuit 210 can receive information from various vehicle sensors to determine whether a call should be placed and if so, whether the call should be placed to a live operator or an automated attendant. Also, the driver may manually initiate a call by operating call switch 205. Communication circuit 201 can be used to transmit and receive information between severity determination circuit 210 and sensors 152, and severity determination circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152, vehicle systems 158 and external systems 159. This data can be used by severity detection circuit 210 to predict the severity of a crash, which in turn can be used to determine whether to initiate a call to a live operator versus an automated attendant. In various embodiments, a threshold detection circuit can be included to determine whether the determined severity of the crash is above a determined threshold. Threshold detection circuit may be implemented as part of severity detection circuit 210 (e.g. performed by processing circuit 203) or it may be implemented as a separate threshold detection circuit.

Figure 3:
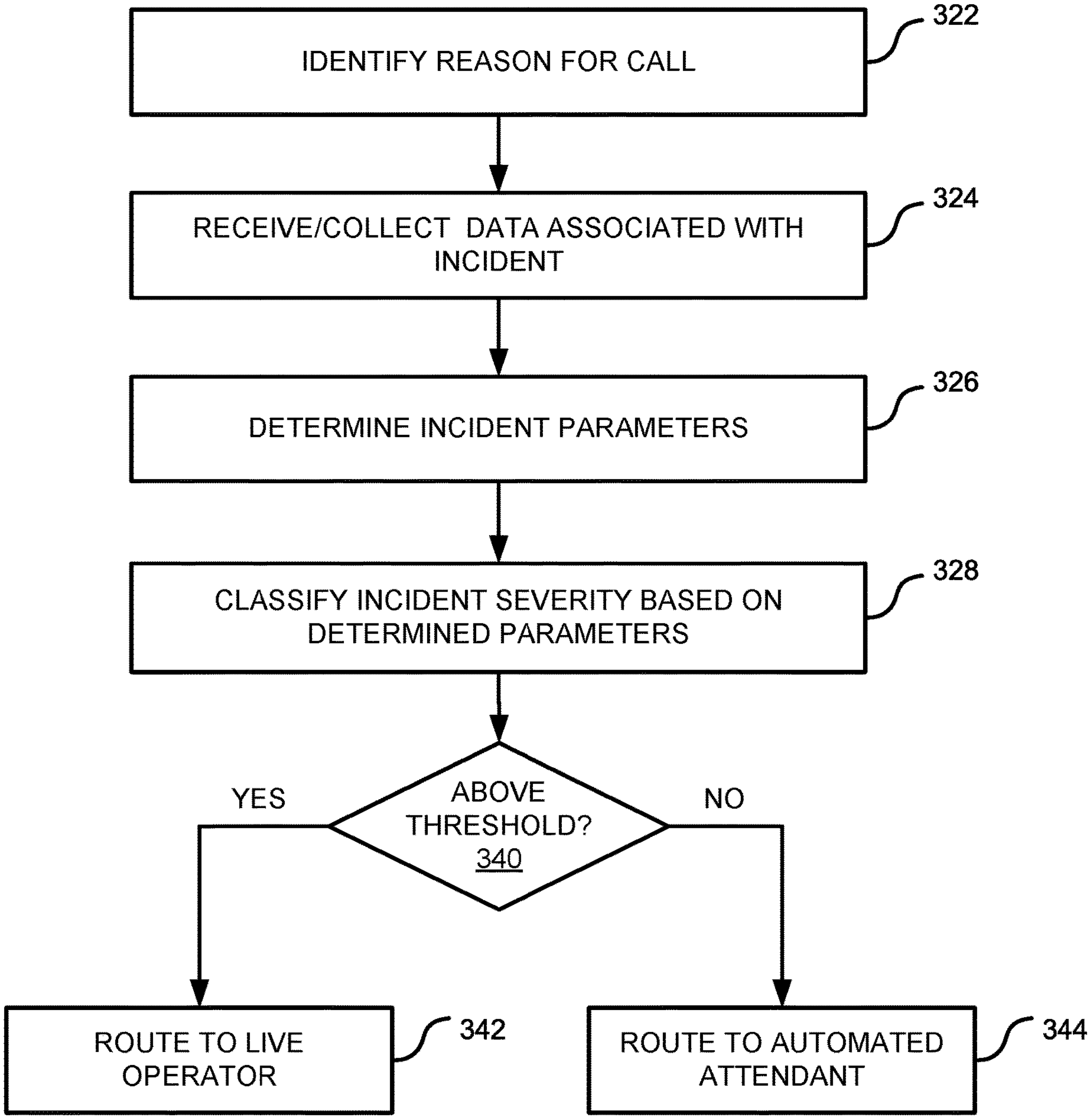
FIG. 3 illustrates an example process for determining call routing in accordance with one embodiment.

FIG. 3 illustrates an example process for determining call routing in accordance with one embodiment. In this example, at operation 322, the system identifies a reason to place a telematics call. For example, the system may determine that an incident of some form has occurred. As a further example, the system may determine based on sensor data that crashes occurred and assistance may be required.

To the extent additional information may be required to determine call routing, at operation 324 the system collects additional data associated with the incident. As described above with reference to FIG. 2, the system may collect data from one or more of a plurality of different sources including, for example, sensors 152, vehicle systems 158 and external systems 159. At operation 326 the system evaluates the data collected to determine parameters associated with the incident using an AI model. Data from one or more data sources can be used to determine each of a number of different parameters associated with the incident.

At operation 328, the system classifies the severity of the incident based on the determined parameters using the AI model. Parameters may include, for example, severity of vehicle damage, crash impact associated with the incident, vehicle deceleration and so on. These various factors can be evaluated to determine the severity value associated with the incident. The severity value can be based on one of these parameters or a combination of two or more of these parameters.

At operation 340, the system compares the determined severity value with a threshold value to determine whether the severity level is above a threshold level beyond which routing of the incident call (e.g., a telematics call from the vehicle) to a live operator is warranted. If the severity level is above threshold, at operation 342 the system routes the incident call directly to a live operator without going through an automated attendant. This can save critical time can be useful in getting vehicle occupants or third parties' assistance needed as a result of the incident. On the other hand, if the severity level determined is below threshold, at operation 344, the system routes the call to an automated attendant to be handled in a more routine fashion. In this way, live operator time is not consumed by handling more routine calls.

In various applications an AI model can be trained to predict the severity of an incident, and the predicted severity can be used to determine call routing. The AI model can be trained using a collection of data from prior incidents with known outcomes. This can include incident data collected from a number of different vehicles (including vehicle sensors and vehicle systems) as well as from a number of different external systems. For example, data used to build and train a model can include crowd sourced data from a large number of prior incidents.

In operation, the trained AI model may be applied to the data that is received from one or more of the data sources described above, including, for example, sensors 152, vehicle systems, 158 and external systems 159. The trained AI model can predict the severity of an incident based on the data received for the incident. The output of the AI model can be compared with one or more severity thresholds to determine call routing based on the prediction. In some embodiments, each of the data values from the various input sources can be associated with a particular data type, and the data types can each have a determined weight in the AI model.

The various input data used by the AI model may be monitored and used to evaluate whether the AI model was trained using data values comparable to the actual input data values. In other embodiments, the prediction of severity can be stored and later compared to an actual value for the severity of the incident such as may be input by a human operator. Prediction errors can be used to refine the AI model.

As noted above, the AI model can be used to evaluate input data from a plurality of different sources to predict the severity of an incident based on the data values. The model can be trained using data from other incidents with known severity outcomes. For example, when predicting the severity of an incident, it may be important to evaluate one or more factors such as speed and trajectory of the vehicle prior to the incident, the magnitude of deceleration faced by the vehicle as part of the incident, impact experienced as part of the incident, images of the vehicle the scene or the occupants, audio information of the incident, and so on.

To train the model, the system may receive training data from one or more data sources including, for example, data from other incidents. The data may also include actual outcome information that can be correlated against the data from those instants. As a further example, the training data may include data associated with a number of known prior incidents involving vehicles. This can include, for example, the sensor information, vehicle systems information and external systems information described above. As part of training, AI system can extract features from the training data and assign weights to the features such that a prediction and magnitude for the parameter correspond to the known parameter values. For example, data that has a higher correlation with a predicted outcome might be assigned a higher weight than data with a lower correlation. The model training process may be implemented as an iterative process that adjusts features and associated weights to achieve the desired degree of accuracy. The training may be implemented as an iterative process of adjusting weights assigned to data types, and the weight assigned to a particular data type can vary depending on the mix of data types used for the model. Thus, a particular data type may have more weight in some instances than in others depending on what other data types are input to the model. The training may be done in the vehicle or the cloud server, or a combination thereof, and then deployed to applicable vehicles via over-the-air update, service tool, etc.

Figure 4:
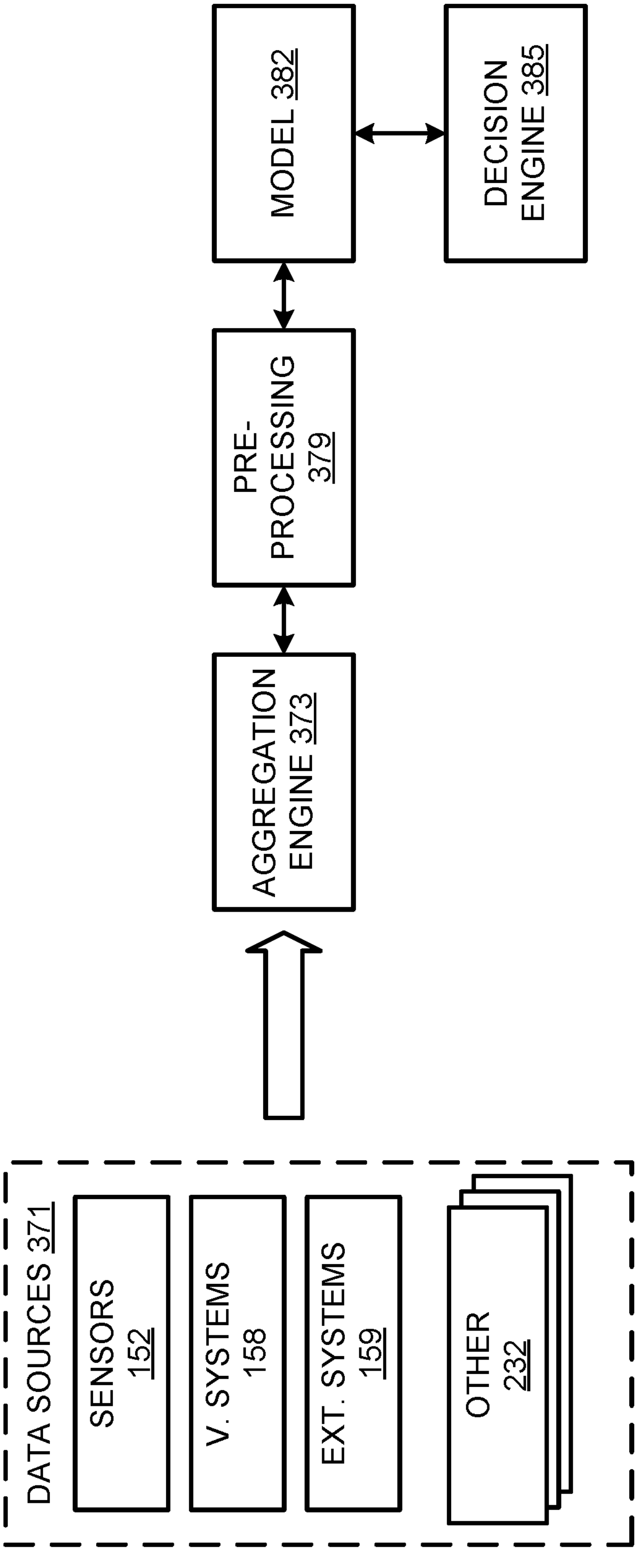
FIG. 4 illustrates an example system for using an AI model to generate a prediction for a severity level of a vehicular incident in accordance with one embodiment.

FIG. 4 illustrates an example system for using an AI model to generate a prediction for a severity level of a vehicular incident in accordance with one embodiment. The example system includes a data aggregation engine 373. The data aggregation engine 373 receives data from one or more of a variety of different data sources 371. The data sources 371 can include sensors, systems and other data sources such as sensors 152 of one or more vehicles; vehicle systems 158 of one or more vehicles; external systems 159 such as infrastructure items, databases, third-party data sources and other external systems; and other sources 232.

The data aggregation engine 373 in various embodiments may be configured to receive data from data sources 371 that is associated with one or more incidents that have occurred. For example, in some embodiments as noted above, the system may receive data from sensors and systems from a plurality of vehicles associated with prior incidents (e.g., collisions) that have occurred. The system can also receive data from third parties or other sources external to a vehicle such as infrastructure data (e.g., data captured from infrastructure elements), data from surrounding entities (e.g., video, images and other data from businesses or other entities in the vicinity of the incidents), data from other vehicles within a defined proximity, and data from external data sources (e.g., traffic, weather, and other information from databases and other like providers).

Data aggregation engine 373 may aggregate and provide the received data to a pre-processing engine 379. Pre-processing engine 379 may pre-process the received data, including, for example, to identify particular data values from the various sources associated with the incidents. For example, data from a previous incident can include a collection of data including particular data fields having corresponding values (e.g., data from the various sensors and systems) that may be relevant to determining the severity of the incident. The data can include structured and unstructured data content.

The system may receive data that requires little or no processing before it can be used. For example, sensor data may provide data indicating detected values that can be used with little or no processing such as 3-axis acceleration data, brake pedal travel data, deceleration rate, and so on. The system may also receive data that requires some level, or a greater level, of processing before it can be used for training or prediction. For example, image data of a collision may require image processing and analysis to determine the severity of a collision.

Pre-processing engine 379 may be configured to output a set of data for a particular incident. This data set may be provided to an AI model 382 that is trained to generate a prediction for incidents based on the values for the data in the data set. AI model 382 can be trained receive as input a large quantity of different data types for the prediction by collating those data, but can be used with smaller amounts of data as well. This allows the AI model 382 to be used when fewer than all of the possible data types are available or received. For example, some vehicles may have fewer sensors or systems to provide data as compared with other vehicles. As another example, in some incident locations infrastructure data may be of limited availability or might not be available at all.

AI model 382 may be trained to assign particular weights to the different data elements depending for example on data type and on the overall set of data types available to the model. Consequently, a particular data type may have a different weight assisted to it depending on the overall mix of data type values provided as input to AI model 382. Additionally, interrelationships between the data elements as well as the individual values of the data elements themselves can be used to train the model and predict the severity of incidents.

AI model 382 may be used to generate a prediction regarding an incident, and more particularly the severity of an incident. Because the model can be trained to crowd source data, the prediction of incident severity can be based on other prior incidents of known severity and the data values associated with those prior incidents.

AI model 382 sends its prediction information to a decision engine 385, which may be used to evaluate the prediction for the incident to determine an action decision. The evaluation can include comparing the severity prediction to a threshold value. For example, if the severity prediction is greater than the threshold value, then a telematics call corresponding to the incident can be made directly to a live operator instead of an automated attendant. On the other hand, if the severity prediction is below the threshold value, the decision engine 385 can determine that the telematics call can be placed to the automated attendant rather than directly to a live operator. Depending on the implementation, the system can be implemented such that for prediction to be above threshold, the prediction would need to be at or above a determined threshold. Similarly, the system can be implemented such that for prediction to be below threshold, the prediction would need to be at or below a determined threshold.

In some applications, determining the threshold can include analyzing historical information on past incidents and the damage caused by these incidents in terms of personal injury or property damage. In some embodiments, the threshold may be set based upon an analysis of multiple factors. For example, different vehicle types may have different threshold levels. Vehicles with fewer active or passive safety restraint systems, vehicles transporting sensitive passengers, vehicles with lower safety ratings, and so on are examples of vehicles that might have a lower threshold level for incident severity. As these examples illustrate, a threshold for the vehicle can be determined based on one or more of these and other vehicle characteristics.

As another example, thresholds may be set for various vehicle occupants and can follow the occupant from vehicle to vehicle. Further to this example, certain classes of occupants or occupants with certain physical challenges or needs might have a lower threshold than healthier or more robust occupants. Biometric sensors can be used to identify an occupant and access his or her threshold when the occupant approaches or enters a vehicle. Likewise, interactions with smart phones, key fobs or other devices carried by an occupant can be used to communicate an occupant-based threshold to a vehicle. Where multiple occupants each having their own threshold are present in a vehicle, the system can use various algorithms to determine which threshold to adopt. In one embodiment, the system may adopt the lowest threshold of all the occupants. In another embodiment, the system may adopt the highest threshold of all the occupants. In yet another embodiment, the system may adopt the mean, median, average or dynamically calibrated threshold of all the occupants.

Figure 5:
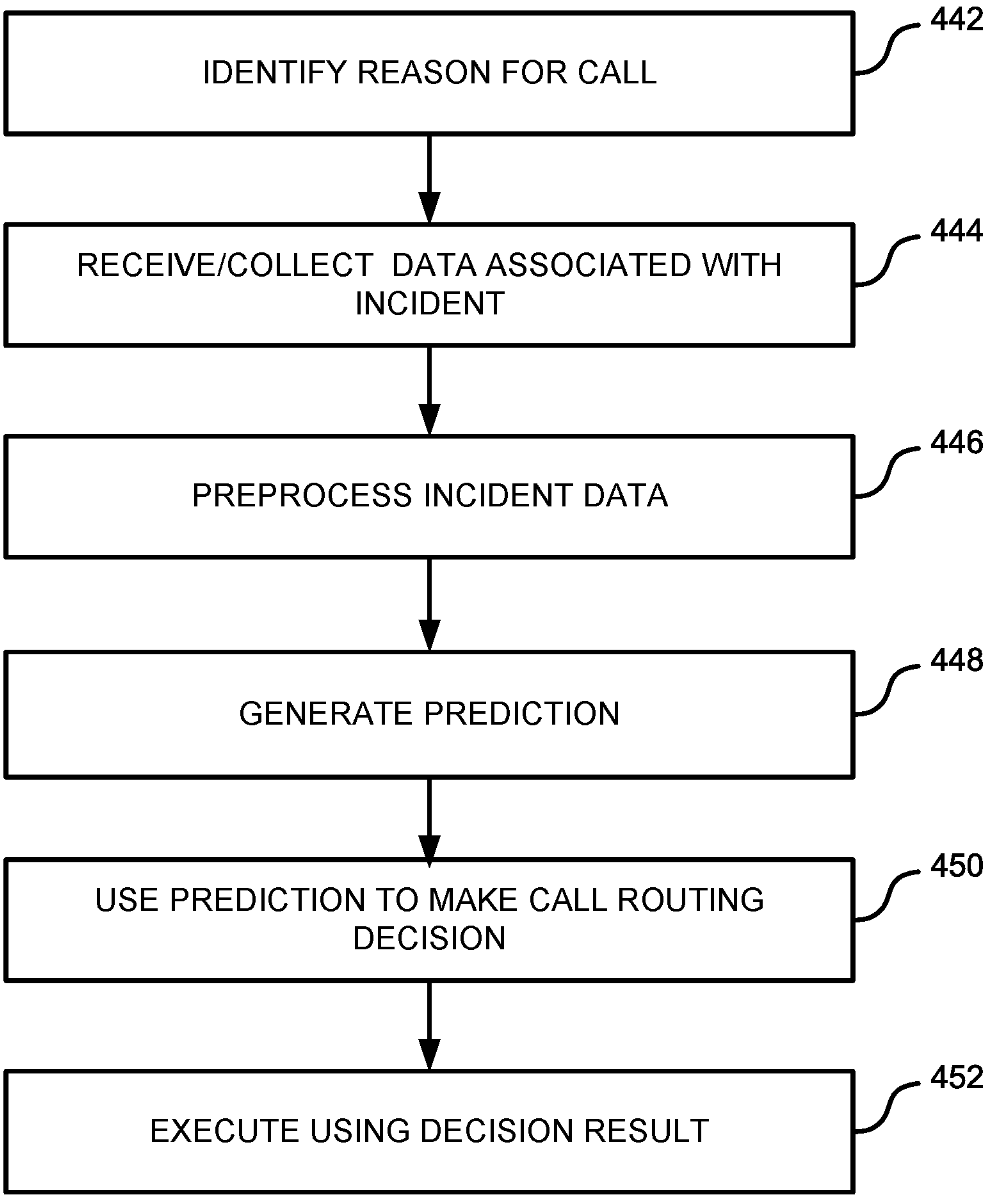
FIG. 5 illustrates an example method for using an AI model to generate a prediction in accordance with one embodiment.

FIG. 5 illustrates an example method for using an AI model to generate a prediction in accordance with one embodiment. Referring now to FIG. 5, at operation 442 the system identifies a reason to place a telematics call. For example, the system may determine that the subject vehicle was involved in a collision. Sensor data, system data or other data may provide information to the system that the system uses to make this determination.

At operation 444, the system receives data associated with the collision. As noted above with reference to various embodiments, the system can receive information such as, for example, sensor data from various vehicle sensors, system data from various vehicle systems and external data from a number of different external sources. In the context of the example of FIG. 4, aggregation engine 373 may receive information from data sources 371.

At operation 446, the system pre-processes the collision data where necessary or useful to place the data in an appropriate form or to extract required data for processing. In the context of FIG. 4, the pre-processing can be performed, for example, by the pre-processing engine 379 to extract data from both structured and unstructured data associated with the collision.

At operation 448, the system generates a prediction of the severity of the collision. In particular, the data received at operation 444 (some or all of which may be preprocessed) can be provided as input to an AI model (e.g., AI model 382) that is trained to generate a prediction for severity of the collision using the input data.

At operation 450, the system uses the generated severity prediction to make a decision regarding call routing for a telematics call regarding the collision. The decision may include, for example, a decision regarding whether to route the call to a live operator or whether to route the call to an automated attendant. As described above with respect to decision engine 385, the decision can be based on a comparison of the predicted severity of the collision to a threshold value. The decision can be provided to the vehicle telematics unit so the call can be placed. Accordingly, at operation 452 the system (e.g., the telematics unit) places the call to the appropriate call center or number to reach determined live operator or automated attendant.

In various embodiments, systems and methods are disclosed in which call routing determinations are made at the vehicle based on one or more of sensor data, system data and external data collected at the vehicle. In other embodiments, routing determinations based on some or all of the same data can be made at the cloud via a cloud processing environment or across a number of vehicles in an edge computing environment. In yet another embodiment, the determination can be made at the call center to which the call is placed and the routing made based on the call center determination.

Figure 6:
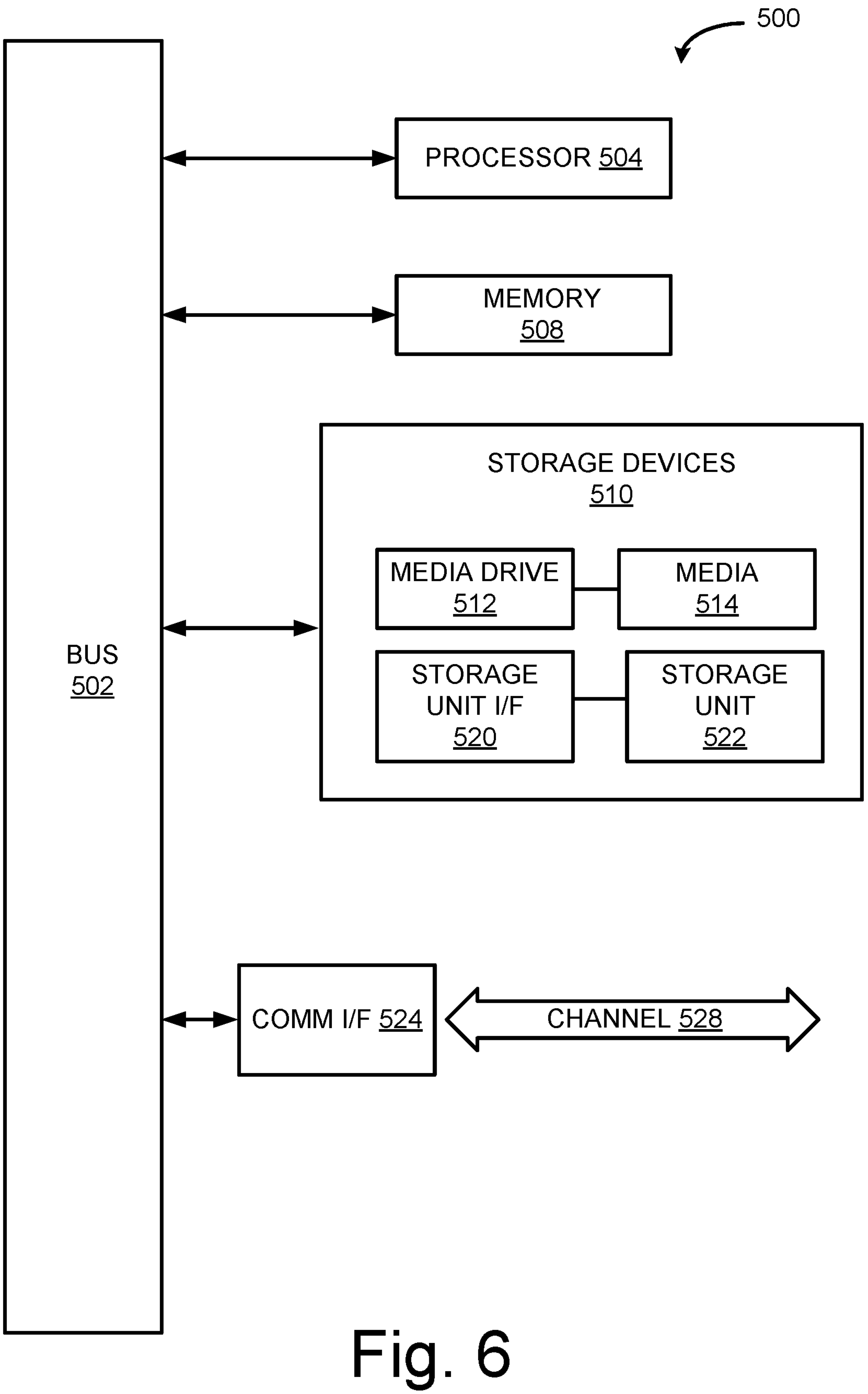
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 500. After reading this description, it will become apparent to a person skilled in the relevant art how to implement the application using other computing components or architectures.

Referring now to FIG. 6, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

receiving sensor data from one or more sensors of a vehicle;

determining severity of a collision involving the vehicle based on the received sensor data; and initiating a telematics call, wherein initiating the telematics call comprises:

if the severity of the collision is above a determined threshold, routing the telematics call to a live operator for assistance; and if the severity of the collision is not above the determined threshold, routing the telematics call to a remote automated attendant for assistance;

wherein the determined threshold is determined based on at least one of a vehicle-specific threshold and an occupant-specific threshold.

2. The method of claim 1, wherein determining the severity of the collision comprises using an AI model to predict the severity of the collision based on the received sensor data, wherein the AI model is developed and trained using sensor data from a plurality of different vehicles involved in collisions.

3. The method of claim 1, wherein the received sensor data comprises vehicle sensor data and environment sensor data.

4. The method of claim 1, further comprising receiving vehicle environment data from third-party data sources and using the vehicle environment data to predict the severity of the collision.

5. The method of claim 4, wherein the vehicle environment data comprises at least one of traffic information, disaster or event information, information from surrounding vehicles or other vehicles involved in the collision, and weather information.

6. The method of claim 1, wherein the vehicle-specific threshold is determined for the vehicle based on vehicle characteristics, and wherein the vehicle characteristics comprise safety features of the vehicle.

7. The method of claim 1, wherein the occupant-specific threshold is determined based on occupant characteristics of an occupant of the vehicle, wherein the occupant characteristics comprise a pre-collision class of the occupant of the vehicle.

8. A system comprising:

one or more vehicle sensors to sense parameters of a vehicle;

a severity detection circuit to predict a severity of a collision involving the vehicle using data from the one or more vehicle sensors;

a threshold detection circuit to determine whether the predicted severity of the collision is above a determined threshold; and a telematics unit configured to initiate a telematics call, wherein initiating the telematics call comprises:

if the predicted severity of the collision is above the determined threshold, routing the telematics call to a live operator for assistance; and if the severity of the collision is not above the determined threshold, routing the telematics call to a remote automated attendant for assistance;

wherein the determined threshold is determined based on at least one of a vehicle-specific threshold and an occupant-specific threshold.

9. The system of claim 8, wherein determining the severity of the collision comprises using an AI model to predict the severity of the collision based on the data from the one or more vehicle sensors, wherein the AI model is developed and trained using sensor data from a plurality of different vehicles involved in collisions.

10. The system of claim 8, wherein the severity detection circuit is further configured to predict a severity of the collision using data from vehicle systems and the one or more vehicle sensors.

11. The system of claim 8, wherein the severity detection circuit is further configured to predict a severity of the collision using data from external systems and the one or more vehicle sensors.

12. The system of claim 8, wherein the vehicle-specific threshold is determined for the vehicle based on vehicle characteristics, and wherein the vehicle characteristics comprise safety features of the vehicle.

13. The system of claim 8, wherein the occupant-specific threshold is determined based on occupant characteristics of an occupant of the vehicle, wherein the occupant characteristics comprise a pre-collision class of the occupant of the vehicle.

14. A control system for initiating a telematics call, comprising:

one or more processors; and memory coupled to the one or more processors to store instructions, which when executed by the one or more processors, cause the control system to:

receive sensor data from one or more sensors of a vehicle;

determine severity of a collision involving the vehicle based on the received sensor data; and initiate a telematics call, wherein initiating the telematics call comprises:

if the severity of the collision is above a determined threshold, routing the telematics call to a live operator for assistance; and if the severity of the collision is not above the determined threshold, routing the telematics call to a remote automated attendant for assistance;

wherein the determined threshold is determined based on at least one of a vehicle-specific vehicle threshold and an occupant-specific occupant threshold.

15. The system of claim 14, wherein determining the severity of the collision comprises using an AI model to predict the severity of the collision based on the received sensor data, wherein the AI model is developed and trained using sensor data from a plurality of different vehicles involved in collisions.

16. The system of claim 14, wherein determining severity of the collision is further based on data from vehicle systems.

17. The system of claim 14, wherein the memory stores further instructions, which when executed by the one or more processors, cause the system to:

receive vehicle environment data from third-party data sources and use the vehicle environment data to predict the severity of the collision.

18. The system of claim 17, wherein the vehicle environment data comprises at least one of traffic information, disaster or event information, information from surrounding vehicles or other vehicles involved in the collision, and weather information.

19. The system of claim 14, wherein the vehicle-specific threshold is determined for the vehicle based on vehicle characteristics, and wherein the vehicle characteristics comprise safety features of the vehicle.

20. The system of claim 14, wherein the occupant-specific threshold is determined based on occupant characteristics of an occupant of the vehicle, wherein the occupant characteristics comprise a pre-collision class of the occupant of the vehicle.

21. The method of claim 1, wherein the occupant-specific threshold for the vehicle is determined based on a plurality of occupant-specific thresholds for a plurality of occupants present in the vehicle.

22. The method of claim 1, wherein the routing to the live operator or to the remote automated attendant is determined prior to initiating the telematics call and the telematics call is placed directly by the telematics unit to a selected endpoint without first connecting to a different endpoint.

* * * * *